June 9, 1936.                    J. SACHS                    2,043,494
                ELECTRICAL CIRCUIT CONTROLLING APPLIANCE
                Original Filed Dec. 13, 1933    4 Sheets-Sheet 1
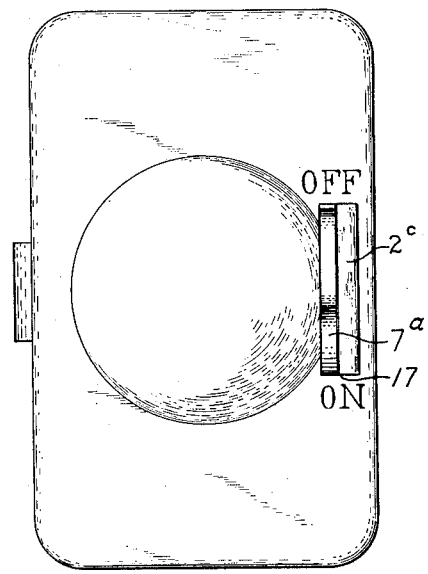
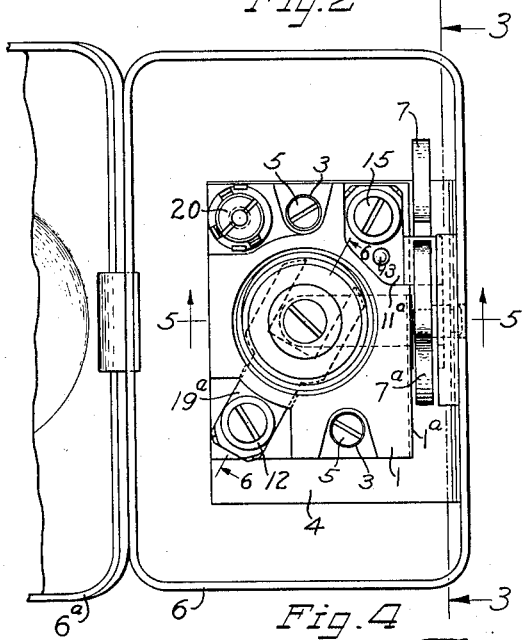
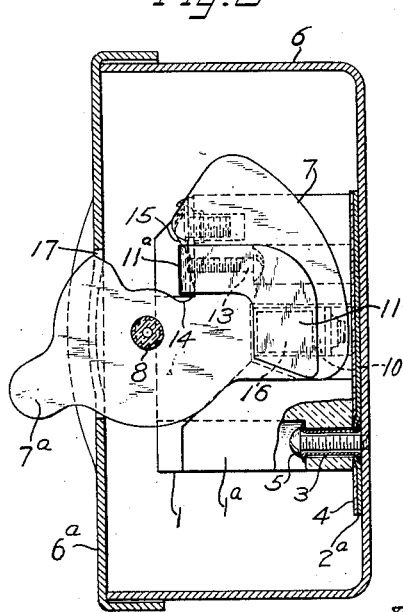
Inventor
Joseph Sachs
By S. Jay Teller
Attorney June 9, 1936.   J. SACHS   2,043,494
ELECTRICAL CIRCUIT CONTROLLING APPLIANCE
Original Filed Dec. 13, 1933   4 Sheets-Sheet 2
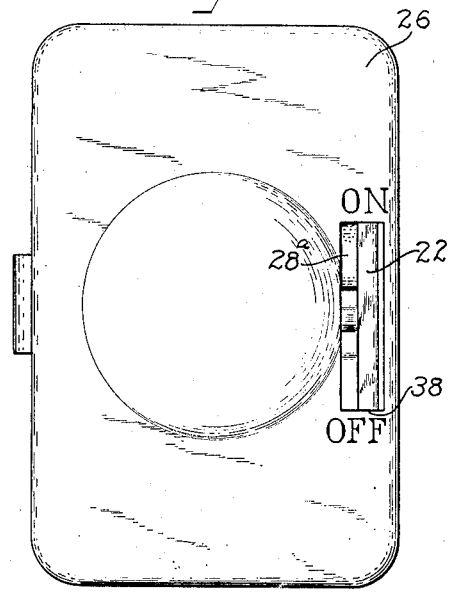
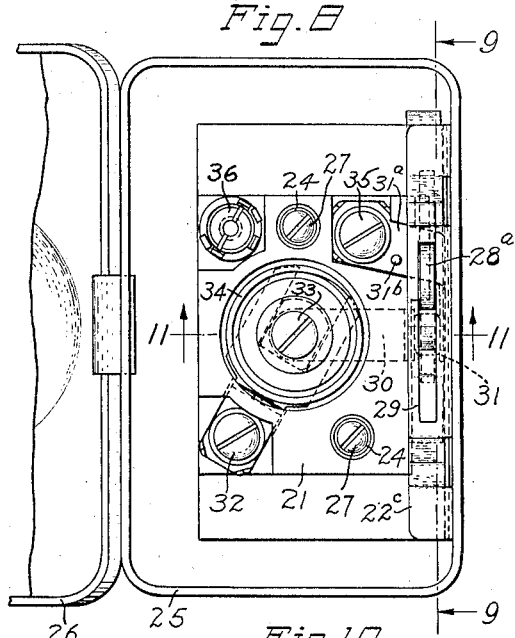
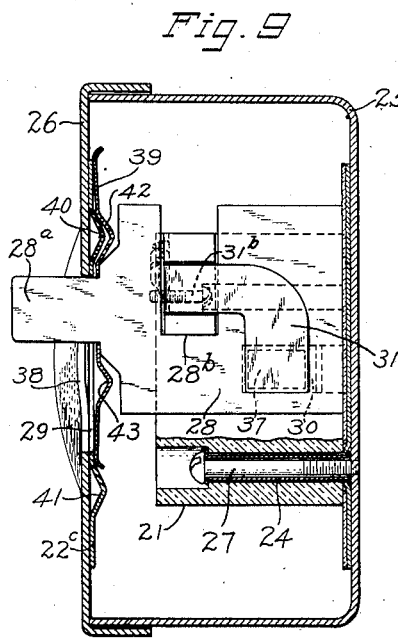
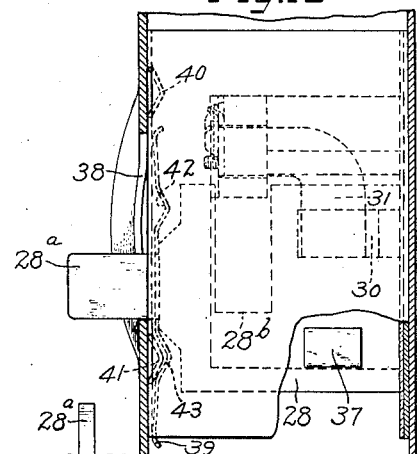
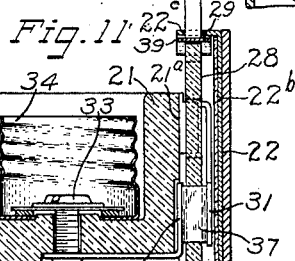
Inventor
Joseph Sachs
By S. Jay Teller
Attorney

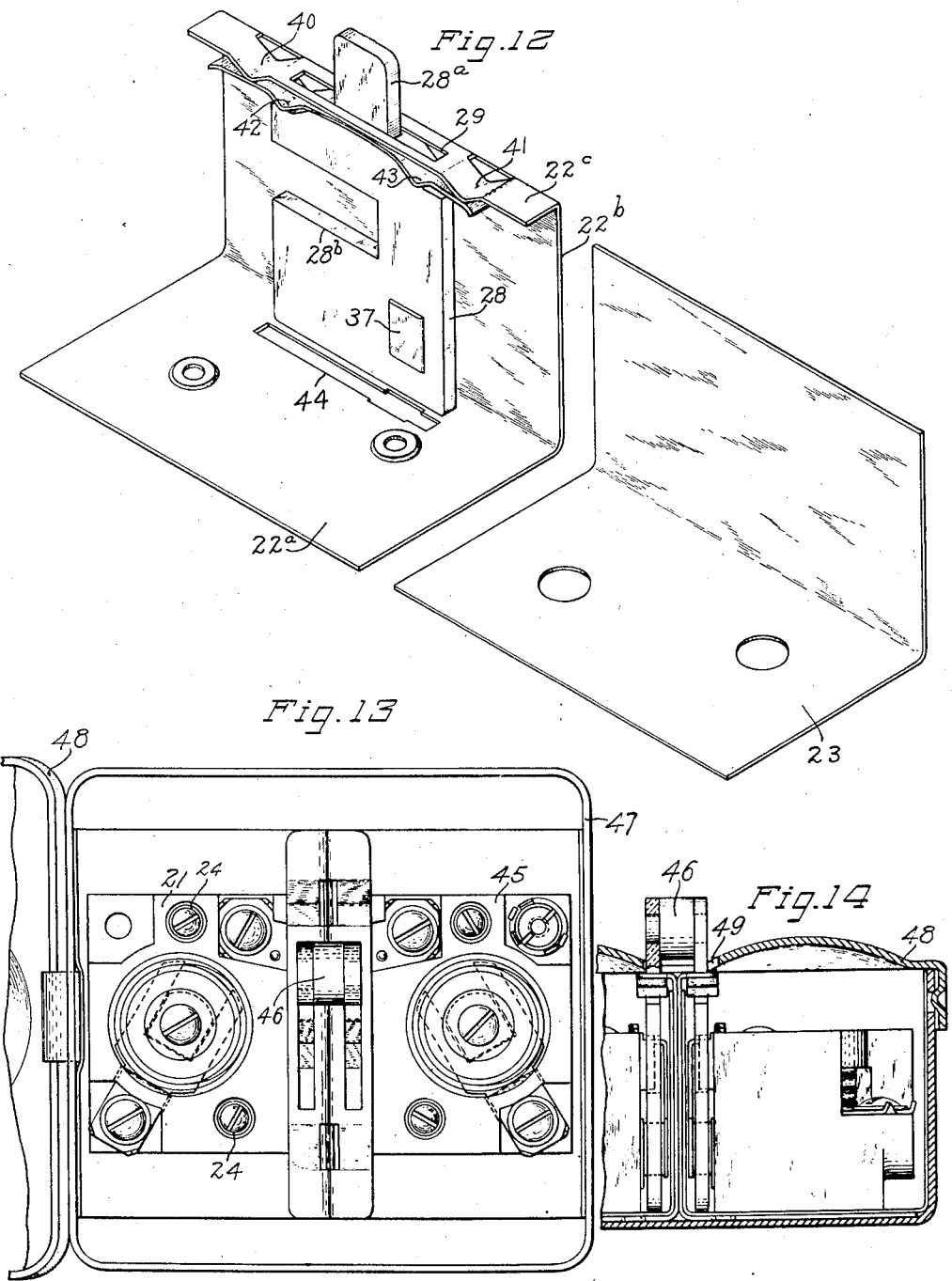

June 9, 1936.  J. SACHS  2,043,494
ELECTRICAL CIRCUIT CONTROLLING APPLIANCE
Original Filed Dec. 13, 1933  4 Sheets-Sheet 4
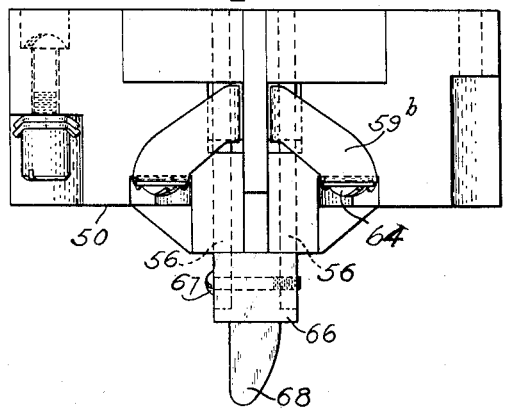
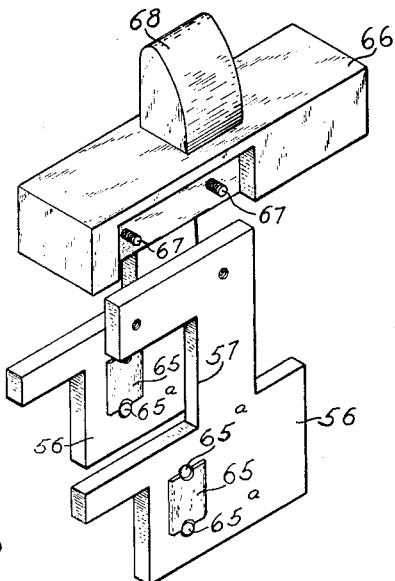
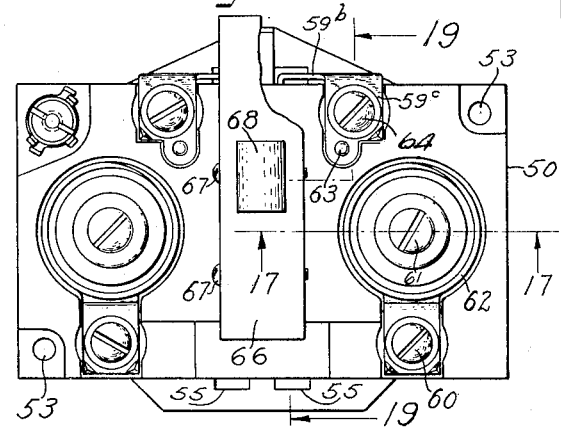
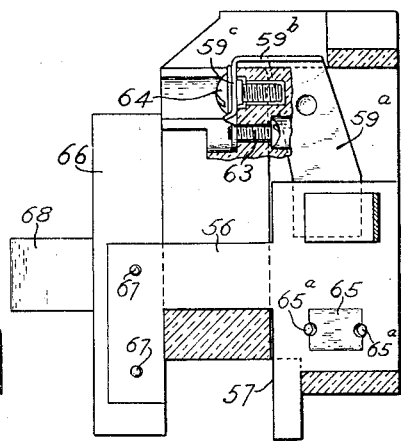
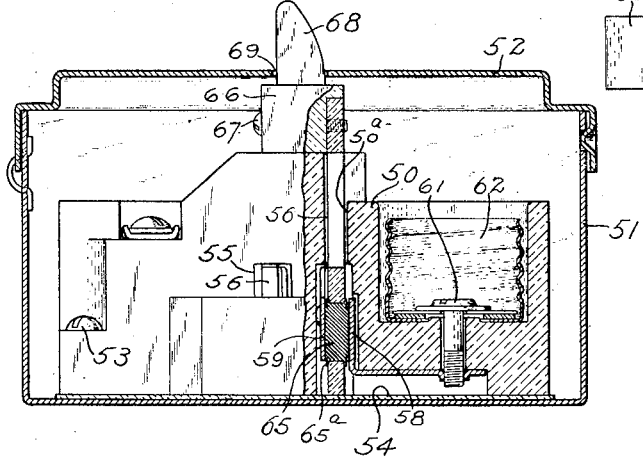
Inventor
Joseph Sachs
By S. Jay Teller
Attorney Patented June 9, 1936

2,043,494

UNITED STATES PATENT OFFICE 2,043,494

ELECTRICAL CIRCUIT CONTROLLING APPLIANCE

Joseph Sachs, West Hartford, Conn.

Application December 13, 1933, Serial No. 702,172
Renewed August 14, 1935

15 Claims. (Cl. 200—114)

The general object of the present invention is to provide an electric circuit controlling appliance, particularly a fused switch, which is very simple and compact and which nevertheless has large current-carrying and current rupturing capacity.

In the accompanying drawings I have shown four different embodiments of the invention in order that its scope may be clearly apparent, but it will be understood that the drawings are intended for illustrative purposes only and are not to be construed as defining or limiting the scope of the invention, the claims forming a part of this specification being relied upon for that purpose.

Of the drawings:

Fig. 1 is a front view of the appliance embodying the invention.

Fig. 2 is a view similar to Fig. 1 with the front cover of the enclosing box open.

Fig. 3 is a vertical sectional view taken, in the main, along the line 3—3 of Fig. 2.

Fig. 4 is a fragmentary view showing the enclosing box in section and showing the interior parts in elevation with certain portions broken away.

Fig. 5 is a fragmentary sectional view taken along the line 5—5 of Fig. 2.

Fig. 6 is a fragmentary sectional view taken along the line 6—6 of Fig. 2.

Fig. 7 is a front view of an alternative appliance embodying the invention.

Fig. 8 is a view similar to Fig. 7 with the front cover of the enclosing box open.

Fig. 9 is a vertical sectional view taken, in the main, along the line 9—9 of Fig. 8.

Fig. 10 is a fragmentary view showing the enclosing box in section and showing the interior parts in elevation with certain portions broken away.

Fig. 11 is a fragmentary sectional view taken along the line 11—11 of Fig. 8.

Fig. 12 is a perspective view more clearly illustrating certain parts of the appliance shown in Figs. 8 to 11.

Fig. 13 is a front view with the cover open of an appliance similar in many respects to that shown in Figs. 8 to 12, but having two pairs of use contacts and two switching means.

Fig. 14 is a fragmentary bottom view of the appliance shown in Fig. 13, the enclosing box being shown in transverse section.

Figs. 15 and 16 are top and front views respectively of an appliance similar to that shown in Figs. 13 and 14, but differing in certain details.

Fig. 17 is a combined bottom and transverse sectional view of the appliance shown in Figs. 15 and 16, the enclosing box being shown in transverse section.

Fig. 18 is a perspective view illustrating certain parts of the appliance shown in Figs. 15 to 17.

Fig. 19 is a fragmentary vertical sectional view taken along the line 19—19 of Fig. 16.

While not necessarily so limited the invention is well adapted to be embodied in a fused switch, and particularly in a switch of this type adapted for a plug fuse. The fused switch shown in Figs. 1 to 6 will first be described.

There is a main insulating base 1 upon which most of the other electrical parts of the appliance are supported. The base 1 has a side face 1ª perpendicular to the rear face thereof. Directly associated with the base is a metallic plate 2 having a portion 2ª at the rear of the base and connected therewith and having a side portion 2ᵇ adjacent the side face 1ª of the base and spaced therefrom. The plate 2 may be directly connected with the base 1 by means of hollow eyelets or tubes 3, 3 as clearly shown in Fig. 3 although such direct connection may be omitted if desired. Preferably the plate 2 is provided with a sheet or lining 4 of insulating material which is interposed between the said plate and the base and which also extends along the portion 2ª at the inner side thereof as shown.

The base 1 and the metal plate 2 are both connected with a suitable rear support by means of screws 5, 5, and when eyelets such as 3, 3 are provided the screws 5, 5 may extend through them. The rear supporting wall may be and preferably is the rear wall of an enclosing box such as 6, the box having an openable front cover 6ª hinged at one side. Preferably the side portion 2ᵇ of the plate 2 is immediately adjacent the side wall of the box as shown in Fig. 5.

A flat insulating plate such as 7 is positioned between the side face 1ª of the base and the side portion 2ᵇ of the metal plate and is manually movable in parallelism therewith. I do not limit myself as to the character of the movement of the plate 7, but in the appliance shown in Figs. 1 to 6 the movement is pivotal about a suitable bearing member 8 carried by the side portion 2ᵇ of the metal plate. This bearing member is in the form of a shouldered pin which may be formed of insulating material and which extends into a hole in the plate 2. The outer end of the bearing pin 8 may be upset to hold it in place and the side wall of the box may be provided with a suitable clearance opening as shown at 9.

Two stationary switch contacts 10 and 11 are mounted on the base 1, being respectively located adjacent the inner and outer surfaces of the movable insulating plate 7. The inner contact 10 is connected with a wire terminal 12 on the base. The outer switch contact 11 has a lateral extension 11ª which extends across or bridges the planes of movement of the insulating plate 7 and is held in place on the base by a screw 13. The plate 7 is provided with a notch 14 to avoid interference between the said plate and the bridging extension 11ª. The extension 11ª is provided with a wire terminal 15 positioned close to the side face 1ª of the base.

Carried by the movable insulating plate 7 is a conducting element 16 which extends through a suitable aperture in the said plate. This element is so positioned that upon pivotal movement of the plate 7 it is moved into or out of a position between the stationary contacts 10 and 11. Figs. 3 and 5 show the element 16 in its closed-circuit position between the contacts, and Fig. 4 shows it in its open-circuit position out of engagement with the contacts.

In order that the plate 7 may be manually moved, it is provided with an extension 7ª which constitutes a handle, this handle portion projecting through a slot 17 in the front cover of the box. It will be seen that by moving the handle 7ª upward or downward the plate 7 with the contact 16 thereon can be moved to close or open the circuit as desired. The slot 17 is wider than the projecting portion of the plate 7 in order that there may be no interference when the cover is opened. In order that the unoccupied portion of the slot 17 may be normally closed the plate 2 is formed with an inward extending flange 2ᶜ.

As already stated, the invention is particularly applicable to a fused switch, and when fuse contacts are provided they are mounted on the base so as to be accessible from the front thereof. Plug fuse contacts 18 and 19 are shown, these being mounted in a recess in the base and being close to the side wall 1ª of the base. The screw constituting the center contact 18 is connected directly with a lateral extension formed integrally with the stationary switch contact 10, and the shell contact 19 is connected with the wire terminal 12 by means of a conductor 19ª of conventional type. If desired the base 1 may be provided with a terminal 20 adapted for the connection of neutral wires.

The construction shown in Figs. 7 to 11 is in many respects similar to that already described. The main insulating base is shown at 21, and associated with this base is a metal plate 22 having a rear portion 22ª and a side portion 22ᵇ. An insulating liner 23 is provided for the plate 22. The base is connected with the rear portion of the plate by means of eyelets or tubes 24, 24. The enclosing box 25 with its side hinged cover 26 is similar to the box already described, and the base 21 and the plate 22 are secured to the rear wall of the box by means of screws 27, 27.

The flat insulating plate 28 is positioned between the side face 21ª of the base and the side portion 22ᵇ of the metal plate, but is adapted to move rectilinearly instead of pivotally. It is guided at the rear by the insulating sheet 23 which is supported by the rear portion 22ª of the metal plate and at the front it extends through a slot 29 formed in an inward projecting flange 22ᶜ on the metal plate.

Two stationary switch contacts 30 and 31 are mounted on the base 21, being respectively located adjacent the inner and outer surfaces of the plate 28. The inner switch contact is connected with a wire terminal 32, preferably through fuse contacts 33 and 34 in the manner already described. The outer switch contact 31 has a lateral extension 31ª which extends across or bridges the planes of movement of the insulating plate 28 and is held in place on the base by a screw 31ᵇ. The plate 28 is provided with a notch 28ᵇ to avoid interference between the said plate and the bridging extension 31ª. The extension 31ª is provided with a wire terminal 35 positioned close to the side face 21ª of the base. If desired the base 21 may be provided with a terminal 36 adapted for the connection of neutral wires.

Carried by the movable insulating plate 28 is a conducting element 37 which extends through a suitable aperture in the said plate. This element is so positioned that upon rectilinear movement of the plate 28 it is moved into or out of a position between the stationary contacts 30 and 31. Figs. 9 and 11 show the element 37 in its closed-circuit position between the contacts, and Fig. 10 shows it in its open-circuit position out of engagement with the contacts.

In order that the plate 28 may be manually moved it is provided with an extension 28ª which constitutes a handle, this handle portion projecting not only through the slot 29 in the flange 22ᶜ, but also through a slot 38 in the front cover 26 of the box. The slot 38 is wider than the projecting portion of the plate 28 in order that there may be no interference when the cover is opened. It will be observed that the inward extending flange 22ᶜ serves to normally close the right hand portion of the slot.

It has already been stated that the plate 28 is guided at the rear by the insulating sheet 23. In order that it may be properly guided at the front there is provided a long narrow metal plate 39 having an opening therein through which the handle 28ª projects. This plate 39 moves with the plate 28 and engages the inner surface of the flange 22ᶜ, thus serving to guide the plate 28 at the front and to prevent forward movement thereof. The plate 39 serves the further purpose of closing that portion of the slot 38 which is not occupied by the handle 28ª.

Preferably in order that the switch member, that is, the plate 28 with the contact 37 thereon, may be moved with an approximation of a snap action, the plate 39 is preferably resilient so as to serve as a detent member adapted to momentarily resist movement of the switch member in either direction. Preferably and as shown the flange 22ᶜ is bent inward to provide two V-shaped projections 40 and 41 and the resilient plate 39 is similarly bent to form V-shaped recesses 42 and 43. With the parts in the position shown in Fig. 9 the projection 40 is engaged in the recess 42 and these parts resist any pressure exerted to move the switch member downward to open the circuit. When the pressure is increased sufficiently to overcome the resistance offered at 40, 42 the switch member will move quickly downward with the approximation of a snap action. Similarly, when the switch member is in its lower open-circuit position, the projection 41 is engaged in the recess 43 and these parts resist any pressure exerted to move the switch member upward to close the circuit. When the pressure is increased sufficiently to overcome the resistance offered at 41, 43 the switch member will move quickly upward with the approximation of a snap action.

As shown in Figs. 11 and 12 the rear portion 22ª of the plate 22 is formed with a slot 44 of such size and shape as to be adapted to receive the switching member for purposes of assembly. In the completed appliance, however, the slot 44 is closed by the insulating sheet 23 and also by the base 21. During assembly the switch member is inserted from the rear through the slot 44, the parts being then in the relative positions shown in the upper portion of Fig. 12. Thereafter the insulating sheet 23 is moved longitudinally into place behind the switch member, thus closing the slot 44. After that the base 21 with the various parts directly carried thereby is put in place and fastened by means of the eyelets 24, 24.

In Figs. 13 and 14 I have shown a construction similar to that shown in Figs. 9 to 12 except that there are two fused switch units which are similar to each other except that they are of right and left construction. The left hand unit is or may be identical with the unit already described in connection with Figs. 7 to 11, there being a base 21 with various parts mounted thereon and associated therewith as already described. The right hand unit is similar except as to reversal of arrangement, there being a base 45 similar to the base 21 but reversed. These two bases 21 and 45 may be regarded as together constituting the insulating base structure of the appliance. The two handles are connected together by means of a block 46 so that the two switching members are movable in unison and constitute a unitary switch contact means. The enclosing box 47 is similar to the box 25 except that it is wide enough to receive the two units. The box cover 48 has its handle receiving slot 49 at the center, this slot being wide enough to accommodate the combined double handle.

The construction shown in Figs. 15 to 19 is similar to that shown in Figs. 13 and 14, but differs as to certain details of construction. The most important difference is that the base structure, instead of consisting of two separate bases 21 and 45, consists of a single unitary base 50. The provision of a single unitary base avoids the necessity for the two metallic plates for supporting and guiding the rectilinearly moving switching members.

There is provided an enclosing box 51 having a front cover 52. The base is secured to the rear wall of the box by means of screws at 53, 53, an insulating sheet 54 preferably being interposed.

The right and left portions of the appliance are similar except for reversal of arrangement, and the description will therefore be confined, in the main, to the portions at the right side. The base 50 is formed with two slots 55, 55 for the two switching members as shown in Fig. 17. The outer wall of each slot is a surface 50ª corresponding to the face 1ª of the base 1 and to the face 21ª of the base 21. Rectilinearly movable in each slot 55 is an insulating plate 56. The plate 56 is provided with a notch 57, the walls of which embrace a portion of the base as clearly shown in Fig. 19, and the plate is thus guided in its rectilinear movement partly by engagement with the base and partly by engagement with the insulating sheet 54 at the rear.

Two stationary switch contacts 58 and 59 are mounted on the base 50, being respectively located adjacent the two surfaces of the plate 56. The switch contact 58 is connected with a wire terminal 60, preferably through fuse contacts 61 and 62 in the manner already described, and is immediately adjacent the surface 50ª. The other switch contact 59 has a longitudinal extension 59ª and a lateral extension 59ᵇ which extends across or bridges the planes of movement of the corresponding insulating plate 56. At the front of the base there is a further extension 59ᶜ which is engaged and held in place on the base by a screw 63. The extension 59ᶜ is provided with a wire terminal 64 which is positioned close to the before-mentioned face 50ª of the base.

Carried by the insulating plate 56 is a conducting element 65 which extends through a suitable aperture in the said plate. This element is so positioned that upon rectilinear movement of the plate 56 it is moved into or out of a position between the stationary contacts 58 and 59. Fig. 17 shows the element 65 in its closed-circuit position between the contacts, and Fig. 19 shows it in its open-circuit position out of engagement with the contacts.

As clearly shown in Figs. 17, 18, and 19 the conducting element 65 is held in place in the plate 56 by means of small projecting fins 65ª, 65ª which are formed by a punching operation after the element has been assembled with the plate.

For manually moving the two plates 56, 56 in unison there is provided a handle member 66 to which both of the plates 56, 56 are connected, as for instance by means of screws 67, 67. This handle member engages the front of the base and serves to assist in guiding the rectilinear movement of the switching members. The handle member 66 has a forward projecting handle 68 which extends through a slot 69 in the front cover 52 of the enclosing box. It will be seen that by moving the handle upward or downward the two switching members can be moved to close or open the circuit as desired.

What I claim is:

1. In a device of the class described, the combination of an insulating base adapted to be held by a rear supporting wall, fuse contacts on the base accessible from the front thereof and positioned closely adjacent a surface of the base perpendicular to the said rear supporting wall, a wire terminal on the base also adjacent the said perpendicular surface and at the same side thereof as the fuse contacts, a flat insulating plate immediately adjacent the said perpendicular surface of the base and manually movable in parallelism therewith, a movable conducting element carried by the insulating plate and having contact faces adjacent the opposite faces thereof, and inner and outer stationary switch contacts on the base respectively adjacent the opposite faces of the insulating plate and adapted to be engaged and disengaged by the movable conducting element, the inner contact having a lateral extension connected with one fuse contact and the outer contact having a lateral extension bridging the insulating plate and connected with the said wire terminal.

2. In a device of the class described, the combination of an enclosing casing having an openable front cover, an insulating base in the casing connected to the rear wall thereof, fuse contacts on the base accessible from the front thereof and positioned closely adjacent a surface of the base perpendicular to the said rear casing wall, a flat insulating plate immediately adjacent the said perpendicular surface of the base and movable in parallelism therewith, a movable conducting element carried by the insulating plate and having contact faces adjacent the opposite faces thereof, inner and outer stationary switch contacts on the base respectively adjacent the opposite faces of the insulating plate and adapted to be engaged and disengaged by the movable conducting element, the inner contact having its contact surface closely adjacent the said perpendicular surface of the base, and a handle rigidly connected with the movable insulating plate and projecting through a slot in the cover of the casing.

3. The combination in an electric switch, of an insulating base, a metallic plate having a portion at the rear of the base and connected therewith and having a side portion adjacent a side face of the base and spaced therefrom, a flat insulating plate positioned between the side face of the base and the side portion of the metal plate and manually movable in parallelism with them, means on the side portion of the metal plate for engaging and guiding the insulating plate, a movable conducting element carried by the insulating plate and having contact faces adjacent the opposite faces thereof, and two stationary switch contacts on the base respectively adjacent the opposite faces of the insulating plate and adapted to be engaged and disengaged by the movable conducting element, one of the said switch contacts being closely adjacent the said side face of the base.

4. The combination in an electric switch, of an enclosing casing having an openable front cover, an insulating base in the casing, a metallic plate separate from the casing and having a rear portion between the base and the rear wall of the casing and also having a side portion adjacent a side face of the base and spaced therefrom, a flat insulating plate positioned between the side face of the base and the side portion of the metal plate and manually movable in parallelism with them, means on the side portion of the metal plate for engaging and guiding the insulating plate, a movable conducting element carried by the insulating plate and projecting at the opposite faces thereof, and two stationary switch contacts on the base respectively adjacent the opposite faces of the insulating plate and adapted to be engaged and disengaged by the movable conducting element.

5. In an electric switch, the combination of an insulating base, a metallic plate having a portion at the rear of the base and connected therewith and having a side portion adjacent a side face of the base and spaced therefrom, a flat insulating plate positioned between the side face of the base and the side portion of the metal plate, bearing means on the side portion of the metal plate for engaging the insulating plate to enable it to move pivotally about a transverse axis, a movable conducting element carried by the insulating plate and having contact faces adjacent the opposite faces thereof, and two stationary switch contacts on the base respectively adjacent the opposite faces of the insulating plate and adapted to be engaged and disengaged by the movable conducting element.

6. In a fused electric switch, the combination of an insulating base, a metallic plate having a portion at the rear of the base and connected therewith and having a side portion adjacent a side face of the base and spaced therefrom, fuse contacts on the base adjacent the said side face thereof and accessible from the front, a wire terminal on the base also adjacent the said side face thereof, a flat insulating plate positioned between the side face of the base and the side portion of the metal plate, bearing means on the side portion of the metal plate for engaging the insulating plate to enable it to move pivotally about a transverse axis, a movable conducting element carried by the insulating plate and projecting at the opposite faces thereof, and inner and outer stationary switch contacts on the base respectively adjacent the opposite faces of the insulating plate and adapted to be engaged and disengaged by the movable conducting element, the inner contact having a lateral extension connected with one fuse contact and the outer contact having a lateral extension bridging the insulating plate and connected with the said wire terminal.

7. The combination in an electric switch, of an insulating base, a metallic plate having a portion at the rear of the base and connected therewith and having a side portion adjacent a side face of the base and spaced therefrom, a flat insulating plate positioned between the side face of the base and the side portion of the metal plate and guided by the said metal plate for rectilinear movement, a movable conducting element carried by the insulating plate and having contact faces adjacent the opposite faces thereof, and two stationary switch contacts on the base respectively adjacent the opposite faces of the insulating plate and adapted to be engaged and disengaged by the movable conducting element.

8. The combination in a fused electric switch, of an insulating base, a metallic plate having a portion at the rear of the base and connected therewith and having a side portion adjacent a side face of the base and spaced therefrom, fuse contacts on the base adjacent the said side face thereof and accessible from the front, a wire terminal on the base also adjacent the said side face thereof, a flat insulating plate positioned between the side face of the base and the side portion of the metal plate and guided by the said metal plate for rectilinear movement, a movable conducting element carried by the insulating plate and projecting at the opposite faces thereof, inner and outer stationary switch contacts on the base respectively adjacent the opposite faces of the insulating plate and adapted to be engaged and disengaged by the movable conducting element, the inner contact having a lateral extension connected with one fuse contact and the outer contact having a lateral extension bridging the insulating plate and connected with the said wire terminal.

9. The combination in an electric switch, of an insulating base, a metallic plate having a portion at the rear of the base and connected therewith and having a side portion adjacent a side face of the base and spaced therefrom, a flat insulating plate positioned between the side face of the base and the side portion of the metal plate and guided by the said metal plate for rectilinear movement, a movable conducting element carried by the insulating plate and projecting at the opposite faces thereof, two stationary switch contacts on the base respectively adjacent the opposite faces of the insulating plate and adapted to be engaged and disengaged by the movable conducting element, and a resilient detent member adapted to releasably engage the metallic plate at the open and closed positions to momentarily resist movement.

10. The combination in an electric switch, of an insulating base, a metallic plate having a portion at the rear of the base and connected therewith and having a side portion adjacent a side face of the base and spaced therefrom, the said side portion having an inward flange with a longitudinal slot therein, a flat insulating plate positioned between the side face of the base and the side portion of the metal plate and guided by the said metal plate for rectilinear movement, the said plate having a handle portion projecting through the slot in the flange, a movable conducting element carried by the insulating plate and having contact faces adjacent the opposite faces thereof, and two stationary switch contacts on the base respectively adjacent the opposite faces of the insulating plate and adapted to be engaged and disengaged by the movable conducting element.

11. The combination in an electric switch, of an insulating base, a metallic plate having a portion at the rear of the base and connected therewith and having a side portion adjacent a side face of the base and spaced therefrom, the said rear portion having a longitudinal slot normally covered by the base and the said side portion having an inward flange with a longitudinal slot therein, a flat insulating plate rectilinearly movable between the side face of the base and the side portion of the metal plate, the said plate being adapted to be inserted in the forward direction through the slot in the rear portion of the plate before the base is in place and the said plate having a handle portion projecting through the slot in the flange, a movable conducting element carried by the insulating plate and having contact faces adjacent the opposite faces thereof, and two stationary switch contacts on the base respectively adjacent the opposite faces of the insulating plate and adapted to be engaged and disengaged by the movable conducting element.

12. In a fused switch of the class described, the combination of a unitary switch contact means movable rectilinearly in parallelism with a rear supporting wall and comprising two separate movable contacts, an insulating base structure adapted to engage the said rear supporting wall and having two portions at opposite sides of the movable switch contact means, two pairs of fuse contacts at the opposite sides of the movable contact means and positioned on the respective portions of the base structure and accessible from the front thereof, two pairs of wire terminals on the respective portions of the base structure with one terminal of each pair connected to one of the corresponding fuse contacts, and two pairs of stationary switch contacts positioned to be engaged and disengaged by the respective movable contacts of the switch contact means, the said stationary contacts being electrically connected respectively with the remaining fuse contacts and the remaining wire terminals.

13. In a fused switch of the class described, the combination of an insulating base structure adapted to engage a rear supporting wall and having two spaced adjacent parallel faces perpendicular to the said rear supporting wall, two pairs of fuse contacts on the base structure accessible from the front thereof and positioned at opposite sides of the two parallel faces, two wire terminals on the base also at opposite sides of the two parallel faces, two parallel flat insulating plates spaced apart and positioned immediately adjacent the respective parallel faces of the base structure and manually movable in unison in parallelism therewith, two movable conducting elements carried respectively by the insulating plates and having contact faces adjacent the opposite faces thereof, and two pairs of stationary switch contacts on the base respectively adjacent the opposite faces of the insulating plates and adapted to be engaged and disengaged by the movable conducting elements, one switch contact of each pair having a lateral extension connected with one fuse contact of the corresponding pair of such contacts and the other switch contact of each pair having a lateral extension bridging the corresponding insulating plate and connected with the corresponding wire terminal.

14. In a switch of the class described, the combination of two insulating bases spaced apart transversely, two metallic plates each having a portion at the rear of the corresponding base and connected therewith and each having a side portion between the bases and spaced from the corresponding side faces thereof, two flat insulating plates positioned between the respective side faces of the base and the corresponding side portions of the metal plates and manually movable in unison in parallelism with them, means on the side portions of the metal plates for engaging and guiding the respective insulating plates, movable conducting elements carried by the respective insulating plates and projecting at the opposite faces thereof, and two pairs of stationary switch contacts on the respective bases adjacent the opposite faces of the respective insulating plates and adapted to be engaged and disengaged by the respective movable conducting elements.

15. In a fused switch of the class described, the combination of two insulating bases spaced apart transversely, two metallic plates each having a portion at the rear of the corresponding base and connected therewith and each having a side portion between the bases and respectively spaced from the corresponding side faces thereof, two pairs of fuse contacts on the respective bases adjacent the said side faces thereof and accessible from the front, two wire terminals on the base also adjacent the said side faces thereof, two flat insulating plates positioned between the respective side faces of the base and the corresponding side portions of the metal plates and guided by the said plates for rectilinear movement in unison, movable conducting elements carried by the respective insulating plates and projecting at the opposite faces thereof, and two pairs of stationary switch contacts on the respective bases adjacent the opposite faces of the respective insulating plates and adapted to be engaged and disengaged by the respective movable conducting elements, one switch contact of each pair having a lateral extension connected with one fuse contact of the corresponding pair of such contacts and the other switch contact of each pair having a lateral extension bridging the corresponding insulating plate and connected with the corresponding wire terminal.

JOSEPH SACHS.